Sept. 18, 1928.
B. JASSEN ET AL
1,684,493
BRACKET CARRIER FOR WIND SHIELD DEFLECTORS
Filed July 31, 1924
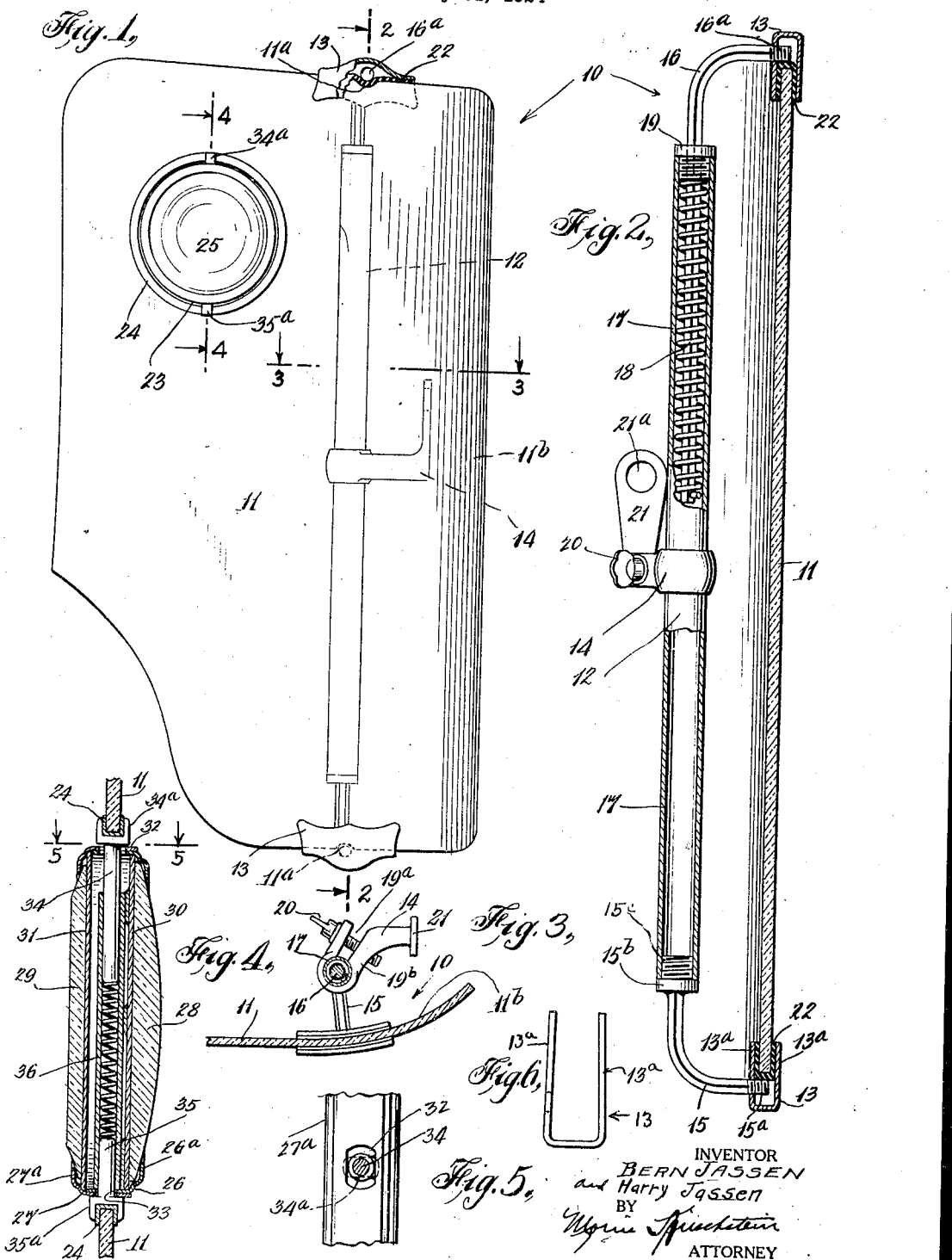
INVENTOR
BERN JASSEN
and Harry Jassen
BY
ATTORNEY Patented Sept. 18, 1928.

1,684,493

UNITED STATES PATENT OFFICE.

BERN JASSEN AND HARRY JASSEN, OF BROOKLYN, NEW YORK.

BRACKET CARRIER FOR WINDSHIELD DEFLECTORS.

Application filed July 31, 1924. Serial No. 729,250.

This invention relates to wind deflectors for automobiles and the like vehicles.

The invention is directed to a device of the character described having a bracket carrier which may be readily applied and adjusted to the various shapes of glass deflectors and which is constructed to absorb and withstand shocks and strains to which the device may be subjected during the operation of the vehicle, thus preventing the breakage of the glass deflector.

Another object of the invention is the provision of a device of the character described with means whereby the clamping member for the glass deflector may be quickly, easily and securely snapped in position thereon and positively hold same against lateral shifting.

A further object of the invention is the provision of a device of the character described having a mirror mounted in an opening in the glass deflector and provided with a liner ring on which the mirror is adjustable in the plane of the deflector, said mirror being pivotally mounted to permit adjusting the same to various relative positions with respect to the deflector and having a quick detachable mounting with the said ring which locks the inter-engaging member against accidental disengagement.

A still further object of the invention is to provide a device of the character described which is constructed of few and simple parts to form a neat, desirable and highly efficient automobile accessory and which is inexpensive to manufacture.

Other objects of this invention will in part be obvious and in part hereinafter pointed out.

Certain features herein shown and described are shown, described and claimed in my co-pending application Serial No. 547,025, filed in the United States Patent Office on the 27th day of March 1922, and accordingly are not claimed herein.

With the above exception, the invention accordingly consists in the features of construction, combinations of elements and arrangements of parts which will be exemplified in the construction hereinafter described and of which the scope of application will be indicated in the following claims.

In the accompanying drawing, in which is shown one of the various possible illustrative embodiments of this invention, Fig. 1 is a front elevational view of the wind deflector embodying the invention;

Fig. 2 is a sectional view taken on line 2—2 of Fig. 1 showing the bracket carrier construction;

Fig. 3 is a fragmentary sectional view taken on line 3—3 of Fig. 1 showing the curved shape of the glass;

Fig. 4 is a sectional view taken through the mirror and mounting therefor on line 4—4 in Fig. 1;

Fig. 5 is a fragmentary sectional view taken on line 5—5 of Fig. 4 showing the upper slotted opening into which the engaging member is depressed for quickly detachably mounting the mirror in place and for locking the said member against accidental depression; and Fig. 6 is an enlarged fragmentary view of the clamping member in normal shape showing the sloping sides for increasing the gripping effect.

Wind deflectors have been found to be highly desirable accessories for standard touring car automobile equipment and are usually secured on one or both of the upright side frames or front wind shield frame supports in the well known manner.

Referring in detail to the drawing, 10 indicates a side wind deflector embodying the invention, comprising a pane of plate glass 11 or other suitable transparent material, a bracket carrier 12 having clamping members 13 for rigidly securing the glass 11 between them, as shown in Figs. 1 and 2, and one or more bracket arms 14 slidingly and adjustably mounted on said carrier 12 to fasten the deflector 10 to the car.

The clamping members 13 of the carrier 12 are preferably formed of stamped metal bent to have a U-shaped cross-section with the sides 13ª thereof normally sloping slightly toward each other as shown in Fig. 6 for the purpose that will be hereinafter appear, and are screwed on to the threaded free ends 15ª and 16ª of two rods 15 and 16 having one end bent at right angles so as to extend from the opposite ends of a normally vertically extending tubular member 17 as shown in Fig. 2. The rod 15 preferably is formed with an enlarged portion 15ᵇ which is securely fastened to the lower end of said tubular member 17 as by means of the threaded connection 15ᶜ to the interior side of the tubular member 17.

The end portion of the rod 16 extends downwardly into the upper end of member 17 and is movable out of the latter against the tension of spring 18 housed in said tubular member 17, said spring being anchored at the lower end of the latter and having its other end abutting a collar 19 screwed into the upper interior end of said member 17 as shown in Fig. 2.

At one end of the bracket arm 14 is a squeeze clamp 19$^b$ having a slotted portion 19$^a$, and a wing screw 20 extending across and threaded into a side of the latter for quickly detachably and adjustably securing said arm 14 on member 17. The slotted portion 19$^a$ is of sufficient width to permit the passage of rod 15 or 16 therethrough and to allow adjustment thereof to embrace said member 17 as shown in Fig. 3. The other end of bracket arm 14 may have formed thereon any suitable means for securing and supporting the deflector 10 to the car, as for example lug 21 having a bolt hole 21$^a$ therein.

Between the glass 11 and the metallic clamping members 13, yieldable materials 22 such as rubber or felt may be interposed to serve as resilient cushions, and the sides 13$^a$ of member 13 because of their normal sloping shape are adapted to act as spring grips for clamping portions of the glass 11, the clamp members being preferably made of resilient material.

Notches 11$^a$ may be provided in the upper and lower edges of the glass 11 for engaging with the cushioned ends of the rods 15$^a$ and 16$^a$ which extend within the members 13 to prevent accidental lateral shifting of the glass 11 with respect to the members 13 as shown in Fig. 1. It should be noted that the threaded connection between members 13 and the ends 15$^a$ and 16$^a$ of members 15 and 16 respectively provide a pivotally adjustable means whereby the said members 13 may be made to conform with non-parallel as well as parallel upper and lower edges of deflectors when the latter are shaped for ornamental effect or for other purposes.

The deflector glass 11 may be of any desirable shape and is preferably formed with a curved portion 11$^b$ as shown in Fig. 3. It has been found that the provision of a curved deflector in place of a plane one on a side wind deflector aids materially in keeping the glass free from dust because with the curved glass the air is always caused to sweep along the surface thereof and thereby act as a wiper, whereas with the plane glass the tendency is only to cut the air, with the wiping effect greatly diminished. Also much better regulation of the ventilation of the air from the side of the car is made possible by adjusting the wiping effect of the curved deflector.

To mount the wind deflector 10, the bracket carrier 12 may be secured to the car in a desired position by means of one or more bracket arms 14 and may be adjusted for height and swivelled about an axis through the tubular member 17 by loosening the squeeze clamp connection of the arms 14. The glass 11 may then be slipped into position between the side 13$^a$ of member 13 on the lower rod 15 until the cushioned end 15$^a$ engages with the notch 11$^a$ on the lower edge of the glass 11 and upper member 13 is pulled to draw the rod 16 out of the tube against the spring 18. The sides 13$^a$ of upper member 13 may then be allowed to snap against the upper edge of the glass under the restoring action of the spring 18, the cushion end 16$^a$ of the rod being adjusted to engage with the upper notch 11$^a$.

Apart from the function of the rod 16 cooperating with the spring 18 to snap clamping member 13 in position against the glass, the rod 16, the tubular member 17, and the spring 18 serve as shock absorbing means. For this purpose the rod 16 has play within the tubular member 17 and under the resilient action of the spring 18 takes up any shocks and strains to which the deflector 10 may be subjected during the operation of the car, thus preventing injury to the glass 11. It should be noted that rod 16 and spring 18 are relatively long and may therefore be applied for clamping of deflectors of various lengths.

If desired, a circular opening 23 may be cut in an upper section of the glass 11 and a liner ring 24 of thin sheet metal may be fitted about the edge of said opening 23 in which a circular mirror 25 may be revolubly and pivotally mounted as shown in Figs. 1 and 4.

The mirror 25 is of two-part frame construction comprising front and rear portions 26, 27 respectively. The latter are annular shaped and are provided with telescoping parts. Each of said portions may be formed with bezzles 26$^a$ and 27$^a$ respectively as shown in Fig. 4. Either portion 26 or 27 may be replaced by a plain metallic polished portion constructed as described and shown in my copending application Serial No. 622,267 filed March 2nd, 1923.

At vertically diametrically opposed ends of the said portions 26, 27, as seen from Figs. 1 and 2 are provided openings 32 and 33 wherethrough freely pass rods 34 and 35, each carrying at their outer ends engaging members 34$^a$, 35$^a$ for interlocking with the ring 24. The inner portions of rods 34, 35 each extend into the opposite ends of a tube 36 fixedly secured in position to the portion 26, and a spring 38 is provided between the rods 34, 35, within tube 36 for urging the members 34$^a$, 35$^a$ into engagement with ring 24.

It is apparent from Fig. 4 that mirror 25 is revoluble in a vertical plane within ring 12 and may be pivoted about rods 34, 35, so as to dispose the mirror surface at any desired vertical angle.

To install the mirror 25 in the glass 11, the liner ring 25 is first formed about the edge of the opening 24 in any suitable manner, and the mirror proper is assembled with the parts as shown in Fig. 4. The member 35 is then positioned to engage ring 24 with the planes of the mirror 25 and the glass 11 at right angles to each other, and the member 34ª is turned so that it can be depressed within the frame, the said upper opening 32 having a slot shaped as shown in Fig. 5, and the inner tube 36 being cut short as shown in Fig. 4 to permit this. The member 34ª is then inserted directly under the ring 24 and allowed to snap into place. It should be noted that on turning the mirror 25 into the plane of the glass 11, the member 34ª is locked against back movement into the frame, thus preventing the accidental removal of the mirror from its engagement with ring 24.

It will thus be seen that there is provided a device in which the several objects of this invention are achieved and which is well adapted to meet the conditions of practical use.

As various possible embodiments might be made of the above invention and as various changes might be made in the embodiment above set forth, it is to be understood that all matter therein set forth or shown in the accompanying drawings is to be interpreted as illustrative and not in a limiting sense.

Having thus described our invention, we claim as new and desire to secure by Letters Patent:—

1. In a device of the character described, a side wind deflector, a pair of clamp members adapted to engage opposite edges of said deflector, rods connected with said clamp members extending inwardly with their free ends in substantially alined relation, a tubular member connected with one of said rods and within which the second rod is telescopically received for sliding movement, and a spring within said tubular member connected with the inner end of the second rod, said tubular member having its end restricted around the sliding rod as an abutment for the spring.

2. In a device of the character described, a side wind deflector, a pair of clamps adapted to engage opposite edges of the deflector, a cushion chamber fixedly connected with one of the clamp members, a plunger carried by the remaining clamp member slidably received within the cushion chamber, and resilient means within said chamber to draw the plunger into said chamber and hold the clamp members against the deflector.

3. A side wind shield for automobiles comprising a deflector, a pair of clamp members adapted to be fitted upon opposite edges of the deflector member, rods connected with said clamp members, a tubular member fixedly connected with one of said rods and having the free end of the remaining rod slidably received therein, said tubular member being restricted around the sliding end of the rod, an abutment on the inner end of the sliding rod, a coil spring fitted around said rod to bear between the rod and the restricted end of the tubular member, and means associated with the tubular member to mount the deflector structure upon an automobile.

In testimony whereof we affix our signatures.

BERN JASSEN.
HARRY JASSEN.